United States Patent
Park

(10) Patent No.: US 10,094,435 B2
(45) Date of Patent: Oct. 9, 2018

(54) METHOD OF LEARNING TORQUE-STROKE CURVE OF ELECTRIC MOTOR CONTROLLED DRY CLUTCH SYSTEM

(71) Applicant: Hyundai Autron Co., Ltd., Seongnam-si (KR)

(72) Inventor: Seong Jin Park, Suwon-si (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 0 days.

(21) Appl. No.: 15/297,991

(22) Filed: Oct. 19, 2016

(65) Prior Publication Data

US 2017/0108062 A1 Apr. 20, 2017

(30) Foreign Application Priority Data

Oct. 20, 2015 (KR) .................. 10-2015-0146237

(51) Int. Cl.
F16D 48/06 (2006.01)
F16D 28/00 (2006.01)

(52) U.S. Cl.
CPC .......... *F16D 48/064* (2013.01); *F16D 28/00* (2013.01); *F16D 2500/1023* (2013.01); *F16D 2500/5012* (2013.01); *F16D 2500/5018* (2013.01); *F16D 2500/7082* (2013.01); *F16D 2500/70205* (2013.01)

(58) Field of Classification Search
CPC ................ F16D 28/00; F16D 48/064; F16D 2500/1023; F16D 2500/5012; F16D 2500/5018; F16D 2500/70205; F16D 2500/7082
See application file for complete search history.

(56) References Cited

U.S. PATENT DOCUMENTS

| 2007/0037660 A1* | 2/2007 | Shishido | ............. F16H 61/0437 477/74 |
| 2014/0136064 A1* | 5/2014 | Baek | ....................... F16D 48/06 701/68 |
| 2014/0136066 A1* | 5/2014 | Cho | ........................ F16D 48/06 701/68 |

FOREIGN PATENT DOCUMENTS

| DE | 102009008520 A1 | 9/2009 |
| DE | 102011080716 A1 | 4/2012 |
| DE | 102011105507 A1 | 12/2012 |
| JP | 2005-30414 A | 2/2005 |
| KR | 10-2014-0055191 A | 5/2014 |

(Continued)

*Primary Examiner* — Edwin A Young
(74) *Attorney, Agent, or Firm* — Morgan, Lewis & Bockius LLP

(57) ABSTRACT

A method for learning a torque-stroke (T-S) curve of an electric motor controlled dry clutch system is disclosed. The method includes calculating a position change value A for allowing a position change point P3 corresponding to an arbitrary torque y3 on a previous T-S curve C1 to follow-up and be moved to an expectation T-S curve C3, by a control unit, calculating a probability Pr_X3 to allow the position change value A to consider various environmental factors of a clutch within a valid range, and multiplying the probability Pr_X3 to the position change value A to calculate a final position change value A, by the control unit, and calculating a new point P3 by applying the final position change value A to the position change point P3 of the previous T-S curve C1, and generating a final T-S curve connecting the new point P3 and a touch point to learn, by the control unit.

7 Claims, 4 Drawing Sheets

(56) References Cited

FOREIGN PATENT DOCUMENTS

KR          10-1526745 B1    6/2015
WO    WO 2012/139546 A1   10/2012

* cited by examiner

METHOD OF LEARNING TORQUE-STROKE CURVE OF ELECTRIC MOTOR CONTROLLED DRY CLUTCH SYSTEM

CROSS-REFERENCE TO RELATED APPLICATION

The present application claims priority under 35 U.S.C 119(a) to Korean Application No. 10-2015-0146237, filed on Oct. 20, 2015, which is herein incorporated by reference in its entirety.

BACKGROUND OF THE INVENTION

Various embodiments of the present disclosure relate to a method for learning a torque-stroke (T-S) curve of an electric motor controlled dry clutch system, and more particularly, to a method for learning a torque-stroke (T-S) curve of an electric motor controlled dry clutch system, which allows a user to learn with an adjusted value by probabilistically analyzing deformation of the T-S curve, which can be caused by a torque error of an engine and an error of a clutch temperature modeling.

RELATED ART

In general, in a transmission that transmits the power of an engine, a clutch as one of the transmission components functions to transmit the power by attaching a driving shaft to which a gear is engaged to the engine or to cut off the power by separating the driving shaft from the engine.

A position of the clutch is changed by an actuator, such as a solenoid or a motor so that the clutch transmits a torque of the engine. A clutch transmission torque capacity according to a movement distance of the clutch is referred to as a "torque-stroke (T-S) curve". The clutch transmission torque according to an accurate clutch movement distance can be predicted by learning the T-S curve by abrasion, thermal deformation, and vehicle deviation.

Meanwhile, when controlling the clutch of a dual clutch transmission (DCT), the actually inputted engine torque can be fully transmitted to the clutch when exactly identifying the relationship (i.e., T-S curve) between the clutch torque and stroke.

For reference, the dual clutch transmission (DCT) is composed of two sets of clutches unlike the conventional single-plate clutch transmission system, and is connected by two input shaft, that is, a rod-shaped axis to transmit the power to a region separated by a rotation movement or linear reciprocation movement and one output shaft.

In addition, the engine is connected to the input shaft by the clutch, and the input shaft is connected to the output shaft by the gear and then transmits the power to the wheels. The clutch is used to connect or disconnect the axis to another axis, and used in changing gear to change the speed as a kind of axis connection device to disconnect or connect the power of the engine for a while.

In case of general seven-shift DCT, odd stage gears such as first, third, fifth, and seventh stage gears are connected to a first input shaft, and a first clutch connects the gear stage to the engine. Also, a reverse gear and even stage gears such as second, fourth, and sixth stage gears are connected to a second input shaft, and a second clutch connects the gear stage to the engine.

Accordingly, while a vehicle is driving by being connected to the output shaft by the first input shaft and odd stage gears, a transmission is performed by applying the even stage gears of the second input shaft and releasing the torque of the first clutch at the same time. Here, the fastened or coupled clutch, for example, the second clutch becomes an on-going clutch, and the released clutch, for example, the first clutch becomes an off-going clutch.

In controlling the above-described dual clutch transmission (DCT), as illustrated in FIG. 1, a clutch actuator 110 which is responsible for a clutch control, a transmission device 120 for controlling the shift torque of the transmission and performing a real gear transmission, and a control unit 130 for controlling the transmission device 120 according to a vehicle speed and throttle valve opening degree are essential.

Here, the transmission device 120 needs to have a preselecting function to simultaneously engage each transmission stage belonging to two transmission lines divided into the even stage and odd stage, and to enable the transmission to be implemented only by changing of fastening and releasing states of the two clutches, as well as simply performing transmission.

Also, the transmission device 120 needs to have an active interlock function to keep a shift lug of the same transmission lines, which is not involved in the transmission to a neural state so that two transmission stages belonging to the same transmission lines are not engaged at the same time. The transmission device 120 needs to provide the above-described basic functions with a simple configuration and structure, and the durability needs to be ensured, and a stable and reliable operability need to be secured.

Meanwhile, the DCT can fully transmit the actually inputted engine torque to the clutch by correctly identify the relationship between the clutch torque and stroke, that is, T-S curve when controlling the clutch. If a clutch torque above a normal value is inputted to a specific stroke on the T-S curve, an excessive direct impact may be generated. In contrast, if a clutch torque less than the normal value is applied, the engine may run-up.

In addition, even that the T-S curve is exactly matched to in the initial time, the T-S curve may be changed from the real value by abrasion or thermal deformation of the clutch, variations in mass production. In order to prevent abnormality of the transmission system or the clutch system, the user learns the T-S curve. However, in case of the dry clutch, since the user cannot accurately know the clutch temperature, the user is likely to learn incorrectly. Also, it is difficult to properly learn the T-S curve because the torque of the engine is always not constant.

The related art of the present disclosure is disclosed in Korean Patent Laid-open Publication No. 2014-0055191 published on May 9, 2014 and entitled "Method for predicting dry clutch transmission torque of vehicle").

BRIEF SUMMARY

According to an embodiment, there is provided a method for learning a torque-stroke (T-S) curve of an electric motor controlled dry clutch system. The method may include calculating, by a control unit, a position change value A for allowing a position change point P3 corresponding to an arbitrary torque y3 on a previous T-S curve C1 to follow-up and be moved to an expectation T-S curve C3; calculating, by the control unit, a probability Pr_X3 to allow a consideration of various environmental factors of a clutch within a valid range the position change value A, and multiplying the probability Pr_X3 to the position change value A to calculate a final position change value A; and calculating, by the control unit, a new point P3 by applying the final position change value A to the position change point P3 of the previous T-S curve C1, and generating a final T-S curve connecting the new point P3 and a touch point to learn.

The step of calculating a position change value A may include moving, by the control unit, the position change point P3 corresponding to the arbitrary torque y3 on the previous T-S curve C1 by a predetermined unit bias; generating, by the control unit, a virtual T-S curve C2 connecting the point P3 of which position is moved by the unit bias on the previous T-S curve C1 and the touch point; calculating, by the control unit, a difference value X between a position at an adaptation point of the virtual T-S curve C2 and a position at an adaptation point of the previous T-S curve C1 corresponding to a torque of the adaptation point of the virtual T-S curve C2; calculating, by the control unit, a position change amount Δpos at the adaptation point of an expectation T-S curve C3 corresponding to the torque of the previous T-S curve C1; and calculating, by the control unit, a position change value A between a position difference value X at the adaptation points of the previous T-S curve C1 and the virtual T-S curve C2, and a position variation amount Δpos at the adaptation points of the previous T-S curve C1 and the expectation T-S curve C3.

The previous T-S curve C1, the virtual T-S curve C2, and the expectation T-S curve C3 may be generated by connecting the touch point and position change points of each of the T-S curves C1, C2 and C3 in a spline curve shape using a spline function.

The previous T-S curve C1 may be a T-S curve stored initially or a T-S curve learned and stored previously, the expectation T-S curve C3 may be a T-S curve generated by connecting the position points corresponding to the respective torque at entire regions while a vehicle actually drives, and the virtual T-S curve C2 may be a T-S curve generated by connecting a point P3 of which position is moved on the previous T-S curve C1 by the unit bias and the touch point.

The unit bias may be set to 1 mm.

The probability Pr_X3 may correspond to a resulting value of a probability density function that is calculated on the basis of a normal distribution curve of the position change value A.

The probability Pr_X3 may be expressed as follows.

Here, σ1 is a standard deviation (aMax/2), and a is a position change value at P3.

$$\frac{1}{\sigma 1 \sqrt{2\pi}} e^{-\frac{a^2}{2\sigma 1^2}}$$

BRIEF DESCRIPTION OF THE DRAWINGS

Various embodiments of an inventive concept will become more apparent in view of the attached drawings and accompanying detailed description, in which.

DETAILED DESCRIPTION

Embodiments of a method of learning a torque-stroke curve of a dry clutch according to the present disclosure will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

In a dry clutch system that controls a position of the clutch by a motor, since a clutch for transmitting or blocking the power in the transmission for transmitting power of a vehicle engine is made of an air-cooling method, the temperature characteristic is inaccurate. According to an embodiment of the present disclosure, there is a provided a method for learning a torque-stroke (T-S) curve of a dry clutch that can correct a friction coefficient and a touch point of the T-S curve more specifically and can be applied to a dry clutch system. The T-S curve means a curve representing a relationship between a clutch transmittable torque and a clutch position.

For reference, for a wet transmission, it is converted into a clutch torque by increasing the position of a solenoid. Since the dry transmission mainly uses an electric motor, it can be calculated as a clutch torque by increasing the position of the motor, that is, a stroke.

In other words, a clutch panel is pushed with increasing the position S, that is, a stroke of the motor, and the force F is generated. A torque T applied to the clutch panel, that is, the T-S curve characteristic is determined by multiplying a friction coefficient μ to the force F. In accordance with this, a desired motor position is calculated to satisfy a desired clutch torque, the desired motor position is converted into a T-S curve, and a transmission control unit (TCU) controls the desired motor position, thereby increasing the clutch torque.

Figure 1:
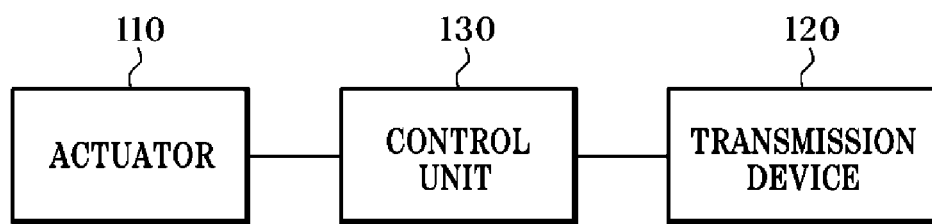
FIG. 1 is a block diagram schematically illustrating a configuration of an apparatus for controlling a general dual clutch transmission.
Figure 2:
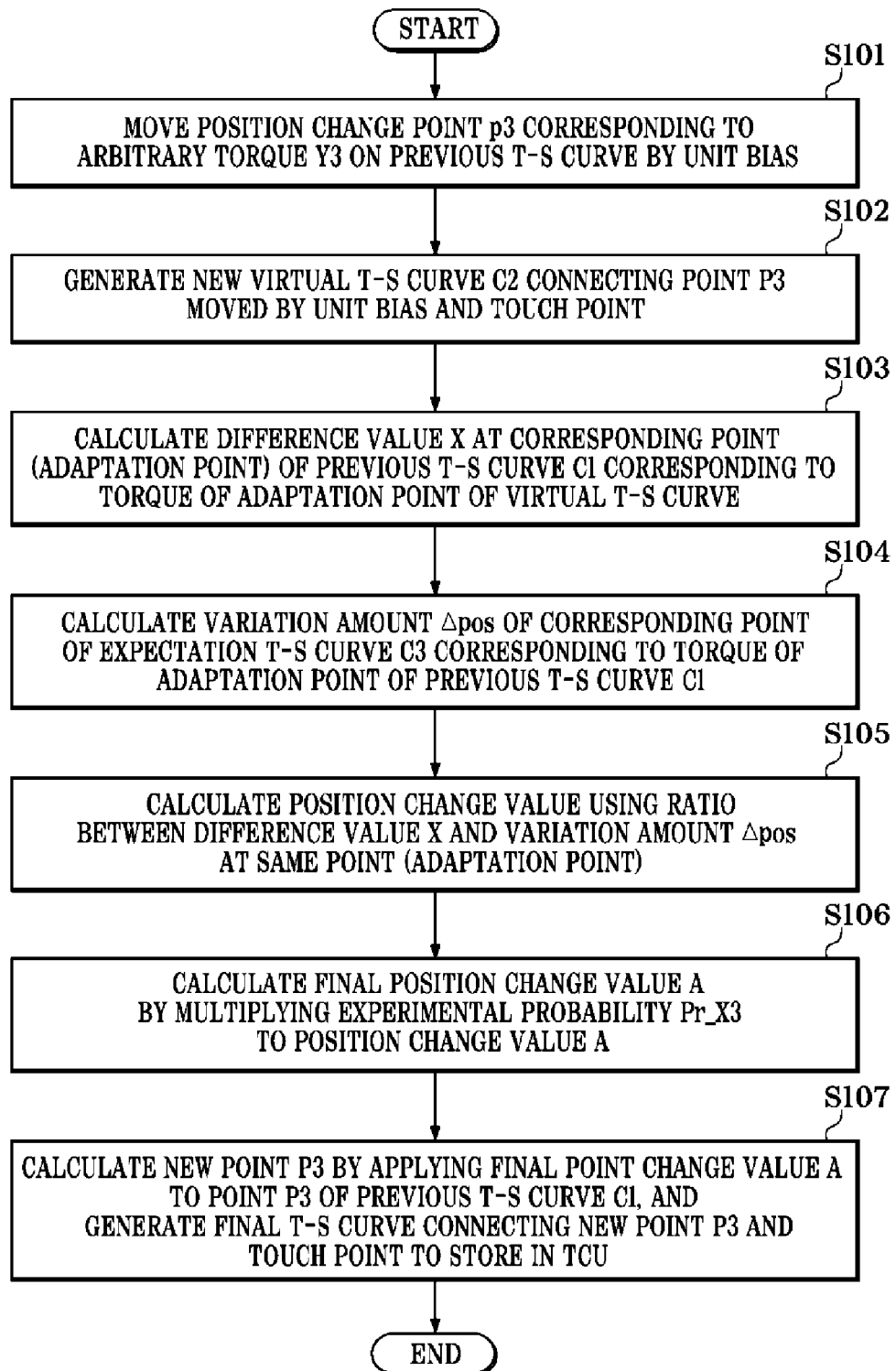
FIG. 2 is a flow chart for explaining a method for learning a torque-stroke curve of a dry clutch according to an embodiment of the present disclosure.
Figure 3:
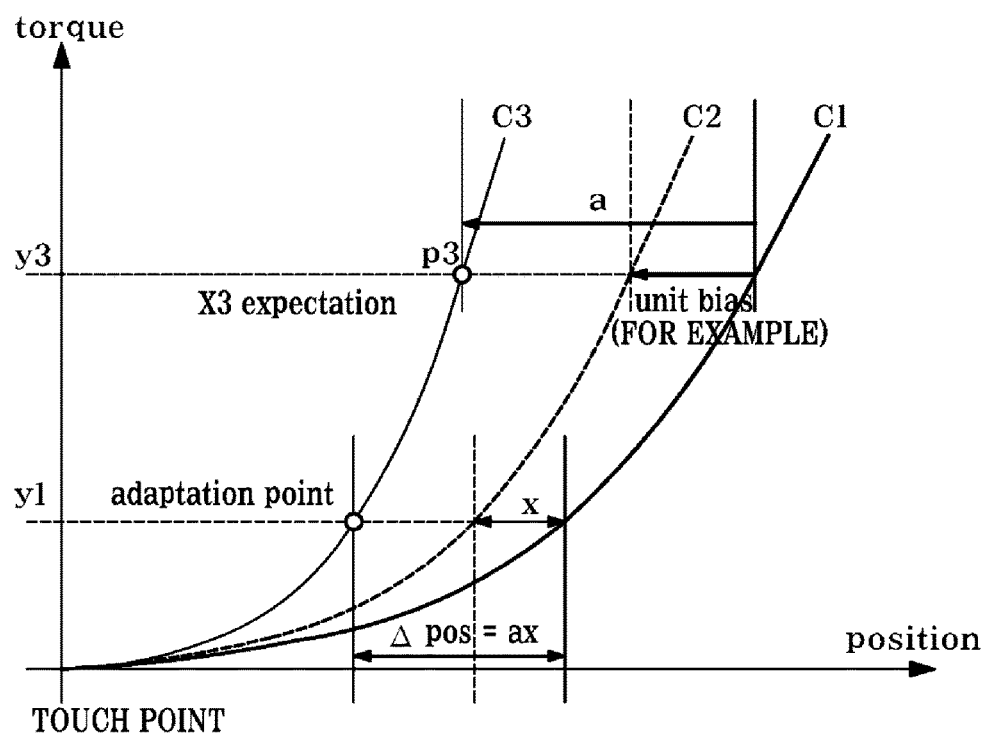
FIG. 3 is an exemplary view illustrating T-S curves for explaining a method for learning a torque-stroke curve of a dry clutch according to an embodiment of the present disclosure.
Figure 4:
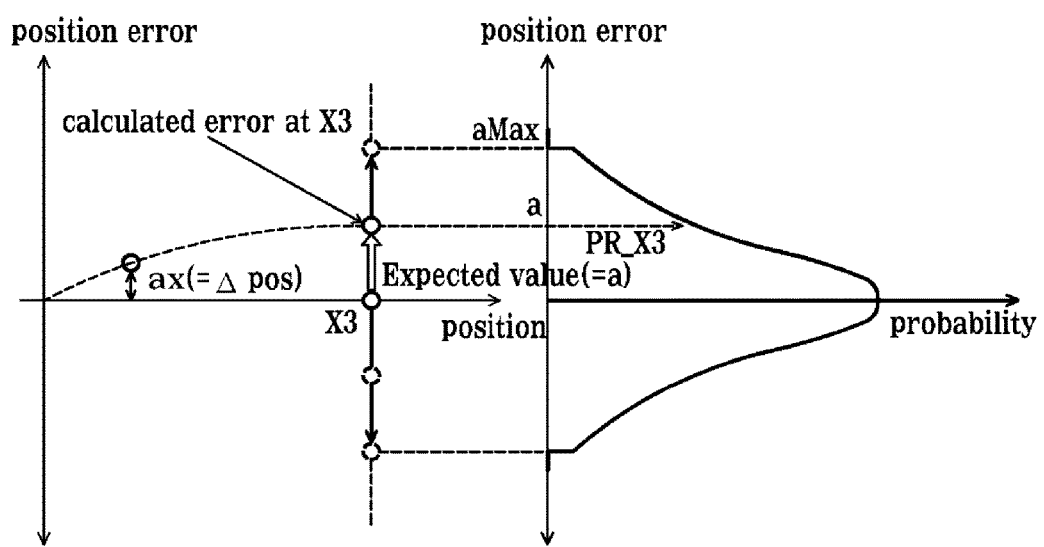
FIG. 4 is an exemplary view for explaining a probability calculation method for generating a final torque-stroke curve according to an embodiment of the present disclosure.

FIG. 1 is a block diagram schematically illustrating a configuration of an apparatus for controlling a dual clutch transmission. FIG. 2 is a flow chart for explaining a method for learning a T-S curve of a dry clutch according to an embodiment of the present disclosure. FIG. 3 is an exemplary view illustrating T-S curves for explaining a method for learning a T-S curve of a dry clutch according to an embodiment of the present disclosure. FIG. 4 is an exemplary view for explaining a probability calculation method for generating a final T-S curve according to an embodiment of the present disclosure.

As illustrated in FIGS. 1 and 2, a control unit 130 for controlling a dual clutch transmission probabilistically analyzes a deformation of a torque-stroke (T-S) curve that can be caused by a torque error of an engine and an error of a clutch temperature modeling and performs the learning with an adjusted value.

Hereinafter, in the present embodiment, the T-S curve predetermined in the control unit 130 in advance, for example, TCU, is referred to as C1, and the T-S curve obtained by a real vehicle driving, for example, a T-S curve obtained by connecting position (that is, a stroke) points corresponding to each torque at entire regions for one hour or one day driving is referred to as C3 (hereinafter, referred to as an "expectation T-S curve") (see FIG. 3).

At this time, though the expectation T-S curve C3 is a T-S curve obtained on the basis of data obtained through the real vehicle drive, but as described-above, the T-S curve cannot be referred to as an accurate T-S curve because the torque of the engine is not constant all the time.

However, the difference between the expectation T-S curve C3 and the previous T-S curve C1 may be checked, and finally, the expectation T-S curve C3 may be formalized to be followed-up by the previous T-S curve C1.

In the present embodiment, in order to easily formalize the expectation T-S curve C3 to be followed-up by the previous T-S curve as described above, a virtual T-S curve C2 may be generated (see FIG. 3).

Hereinafter, a method for learning the T-S curve of a dry clutch will be described with reference to FIGS. 2 to 4.

Firstly, referring to FIG. 2, the control unit 130 moves a position change point, for example, P3 corresponding to an arbitrary torque, for example, y3 on the previous T-S curve, for example, C1 by a predetermined unit bias (S101).

The unit bias is a value to be set arbitrarily, and it is preferable to set the unit bias to a value that can be easily used in the calculation of the T-S curve. For example, in this embodiment, it is assumed that the unit bias is set to 1 mm.

Next, the control unit 130 generates a new virtual T-S curve, for example, C2 that connects a point P3 moved by the unit bias, for example, 1 mm from the previous T-S curve C1 and a touch point (S102).

For reference, the T-S curves, for example, C1, C2, C3, etc. that connect the touch point and a position change point, for example, P3 corresponding to the arbitrary torque, for example, y3 may be generated in a spline curve shape using the spline function.

Next, the control unit 130 calculates a difference value X at a corresponding point, that is, an adaptation point, of the previous T-S curve C1, which corresponds to the torque of the adaptation point (a learning point) of the virtual T-S curve C2.

Here, the adaptation point is a kind of learning points, and refers to a position corresponding to a torque y1, that is, an engine torque at which the engine and clutch are adapted. The difference value X corresponds to a value obtained by calculating a moved amount of a position, that is a stroke, from a torque at which learning occurs, that is a torque of the adaptation point, when is moved from a point P3 of the previous T-S curve C1 by a unit bias in a position direction, that is, an X-axis direction.

For reference, the position change point P3 means a point at which the position value X3 and the torque value y3 meet each other. But, in this embodiment, since only the position value, that is the stroke value, X3 moves in a state each of the points, for example, the adaptation point, P3, or the like is constant, that is, does not changed, as a result, the point P3 may be referred to as the point X3.

Next, the control unit 130 calculates a variation amount Δpos at a corresponding position, that is the adaptation point, of the expectation T-S curve C3 identically corresponding to the torque of the adaptation point of the previous T-S curve C1 (S104).

Next, the control unit 130 calculates a position change value (A=Δpos/X) using a ratio between a difference value X at the same positions, that is, the adaptation points of the previous T-S curve C1 and the virtual T-S curve C2, and a variation amount Δpos at the same positions, that is, the adaptation points of the previous T-S curve C1 and the expectation T-S curve C3 (S105).

At this time, if the position change value A calculated using the ration between the difference value X and the variation amount Δpos is an accurate value, a new point P3 may be calculated by applying the position change value A to the previous T-S curve C1, and a final T-S curve connecting the new point P3 and the touch point may be generated to store or learn to the control unit 130, for example, TCU.

However, in practice, that is, experimentally, there is a possibility that the position change value A calculated using the ratio between the difference value X and the variation amount Δpos is not accurate due to various environmental factors of the clutch, for example, friction of the clutch, temperature, or the like.

Accordingly, in this embodiment, the control unit 130 calculates a final position change value A by multiplying a probability Pr_X3 in consideration the various environmental factors, for example, fraction of the clutch, temperature, or the like within a range in which the position change value A is valid (S106).

For reference, the probability Pr_X3 can be expressed as follows.

$$\frac{1}{\sigma 1 \sqrt{2\pi}} e^{-\frac{a^2}{2\sigma 1^2}}$$

Here, σ1 is a standard deviation (aMax/2), and a is a position change value or position error at P3.

Referring to FIG. 4, the position error, that is, the position change value is a value indicating how much the T-S curve will vary at a time. In this embodiment, the T-S curve is a T-S curve that can vary when the calculated position change value A is applied.

The maximum value aMax, that is, a maximum value for A of the position error does not vary more than 1 mm, experimentally but the maximum value aMax may be set to another value, for example, 3 mm.

For example, the maximum value aMax may be calculated using known formulas, or may be calculated on the basis of an experiential value. However, if the position change value A is equal to or greater than the maximum value aMax, it may be determined that the touch point is calculated incorrectly or that there are other problems. In other words, the control unit 130 may determine that the position change value A is not valid.

When the maximum value aMax is determined as described above, a result value of a probability density function, that is, a probability Pr_X3 may be calculated by a normal distribution curve, as illustrated in FIG. 4. Also, a final position change value A may be calculated by multiplying the probability Pr_X3 to the position change value A.

Referring back to FIG. 2, the control unit 130 calculates a new point P3 by applying the final position change value A to the position change point P3 of the previous T-S curve C1, and generates a final T-S curve (not illustrated) connecting the new point P3 and the touch point to store or learn to the control unit 130, for example, TCU (S107).

In other words, the virtual T-S curve may be generated by moving the point P3 of the previous T-S curve C1, that is, a point meeting at the y3 torque of the C1 by a predetermined unit bias, for example, ±1 mm and connecting to the touch point. The position change value A of the point P3 may be calculated using a ratio between the difference value X at the same adaptation point of the two T-S curves C1 and C2, and the position variation amount Δpos at the same adaptation point of the two T-S curves C1 and C3. In other words, after applying the position change value A to the point P3 of the T-S curve C1 and moving the position, the changed point P3 or X3 is connected to the touch point, thereby generating the final T-S curve (not illustrated).

At this time, in this embodiment, the final position change value A is calculated by multiplying an experiential probability to the position change value A. The final position change value A is applied to the point P3 or X3 of the previous T-S curve C1 (that is, X3_new=X3_old+{a*Pr_X3}) and moved, thereby generating a T-S curve connecting the moved final point P3 or X3 to the touch point. The generated T-S curve may, as a result, become the final T-S curve (not illustrated) to which the probability is applied.

As described above, according to an embodiment, deformation of a T-S curve, which can be generated by a torque error of an engine and an error of the clutch temperature modeling can be probabilistically analyzed. Accordingly, the user can learn with an adjusted value.

The embodiments of the inventive concept have been disclosed above for illustrative purposes. Those of ordinary skill in the art will appreciate that various modifications, additions and substitutions are possible, without departing from the scope and spirit of the inventive concept as disclosed in the accompanying claims.

What is claimed is:

1. A method for learning a torque-stroke (T-S) curve of an electric motor controlled dry clutch system, the method comprising:
    calculating, by a control unit, a position change value A for allowing a position change point P3 corresponding to an arbitrary torque y3 on a previous T-S curve C1 to follow-up and be moved to an expectation T-S curve C3;
    calculating, by the control unit, a probability Pr_X3 to allow a consideration of various environmental factors of a clutch based on a maximum value of a valid range in which the position change value A varies, and multiplying the probability Pr_X3 to the position change value A to calculate a final position change value A;
    calculating, by the control unit, a new point P3 by applying the final position change value A to the position change point P3 of the previous T-S curve C1, and generating a final T-S curve connecting the new point P3 and a touch point; and
    controlling, by the control unit, a stroke of an electric motor based on the final T-S curve so that a dry clutch transmits a target torque from an engine, the electric motor changing a position of the dry clutch.

2. The method of claim 1,
wherein the step of calculating a position change value A comprises:
    moving, by the control unit, the position change point P3 corresponding to the arbitrary torque y3 on the previous T-S curve C1 by a predetermined unit bias;
    generating, by the control unit, a virtual T-S curve C2 connecting the point P3 of which position is moved by the unit bias on the previous T-S curve C1 and the touch point;
    calculating, by the control unit, a difference value X between a position at an adaptation point of the virtual T-S curve C2 and a position at an adaptation point of the previous T-S curve C1 corresponding to a torque of the adaptation point of the virtual T-S curve C2;
    calculating, by the control unit, a position change amount Δpos at the adaptation point of an expectation T-S curve C3 corresponding to a torque of the previous T-S curve C1; and
    calculating, by the control unit, the position change value A based on a position difference value X at the adaptation points of the previous T-S curve C1 and the virtual T-S curve C2, and a position variation amount Δpos at the adaptation points of the previous T-S curve C1 and the expectation T-S curve C3.

3. The method of claim 2,
wherein the previous T-S curve C1, the virtual T-S curve C2, and the expectation T-S curve C3 are generated by connecting the touch point and position change points of each of the T-S curves C1, C2 and C3 in a spline curve shape using a spline function.

4. The method of claim 3,
wherein the previous T-S curve C1 is a T-S curve stored initially or a T-S curve learned and stored previously,
the expectation T-S curve C3 is a T-S curve generated by connecting the position points corresponding to respective torque at entire regions while a vehicle actually drives, and
the virtual T-S curve C2 is a T-S curve generated by connecting a point P3 of which position is moved on the previous T-S curve C1 by the unit bias and the touch point.

5. The method of claim 2, wherein the unit bias is set to 1 mm.

6. The method of claim 1, wherein the probability Pr_X3 corresponds to a resulting value of a probability density function that is calculated on a basis of a normal distribution curve of the position change value A.

7. The method of claim 6, wherein the probability Pr_X3 is expressed as an equation of:

$$\frac{1}{\sigma 1 \sqrt{2\pi}} e^{-\frac{a^2}{2\sigma 1^2}}$$

wherein σ1 is a standard deviation of aMax/2, the aMax is the maximum value, and a is the position change value at P3.

* * * * *